United States Patent
Fantino

[19]

[11] Patent Number: 5,972,146
[45] Date of Patent: Oct. 26, 1999

[54] CONTINUOUS FORMING METHOD AND DEVICE FOR A COMPOSITE STRUCTURE, IN PARTICULAR A COMPOSITE STRUCTURE FEATURING THREE-DIMENSIONAL FABRIC

[75] Inventor: Marco Fantino, Genoa, Italy

[73] Assignee: Metalleido S.r.l., Genoa, Italy

[21] Appl. No.: 08/765,251

[22] PCT Filed: Jun. 21, 1994

[86] PCT No.: PCT/IT94/00090

§ 371 Date: Feb. 18, 1997

§ 102(e) Date: Feb. 18, 1997

[87] PCT Pub. No.: WO95/35201

PCT Pub. Date: Dec. 28, 1995

[51] Int. Cl.$^6$ .......................... B29D 24/00; B29C 70/24; B29C 70/52

[52] U.S. Cl. ................... 156/161; 156/229; 156/292; 156/324; 156/494; 156/543; 156/547; 156/148; 139/384 R; 139/410

[58] Field of Search ................... 156/160, 161, 156/229, 292, 285, 324, 494, 578, 547, 543, 148; 428/86, 257; 139/384 R, 410

[56] References Cited

U.S. PATENT DOCUMENTS

| | | | |
|---|---|---|---|
| 3,048,198 | 8/1962 | Koppelman et al. | 139/410 |
| 3,215,583 | 11/1965 | Holme . | |
| 3,234,972 | 2/1966 | Koppelman et al. | 139/410 |
| 5,166,480 | 11/1992 | Böttger | 181/292 |
| 5,188,555 | 2/1993 | Horovitz | 139/384 R |
| 5,580,412 | 12/1996 | Fantino | 156/161 |
| 5,630,897 | 5/1997 | Branca et al. | 156/148 |

FOREIGN PATENT DOCUMENTS

| | | |
|---|---|---|
| 1475603 | 4/1967 | France . |
| 92/21511 | 12/1992 | WIPO . |
| 93/04224 | 3/1993 | WIPO . |

*Primary Examiner*—Jeff H. Aftergut
*Attorney, Agent, or Firm*—Venable; George H. Spencer; Ashley J. Wells

[57] ABSTRACT

A method of continuously forming a composite structure comprised of a three-dimensional fabric including first and second sheets of fabric which face each other and which are connected by intermediate yarn, the method including providing a continuous supply of three-dimensional fabric; impregnating the three-dimensional fabric with resin which is thermoreactive; mating the three-dimensional fabric with a first outer strip which contacts the first sheet of fabric, and a second outer strip which contacts the second sheet of fabric to form a stratified structure containing the impregnated three-dimensional fabric; feeding the stratified structure along a path in a feed direction X which is straight; heating the stratified structure to at least partially polymerize the resin between the first outer strip and the first sheet of fabric and between the second outer strip and the second sheet of fabric, while the resin impregnating the intermediate yarn of the three-dimensional fabric remains substantially in the plastic state, so that the first and second outer strips adhere respectively to the first and second sheets of fabric; parting the first and second outer strips as the stratified structure is fed in feed direction X to at least partially distend the intermediate yarn of the three-dimensional fabric; and fully solidifying the resin impregnating the three-dimensional fabric.

40 Claims, 1 Drawing Sheet

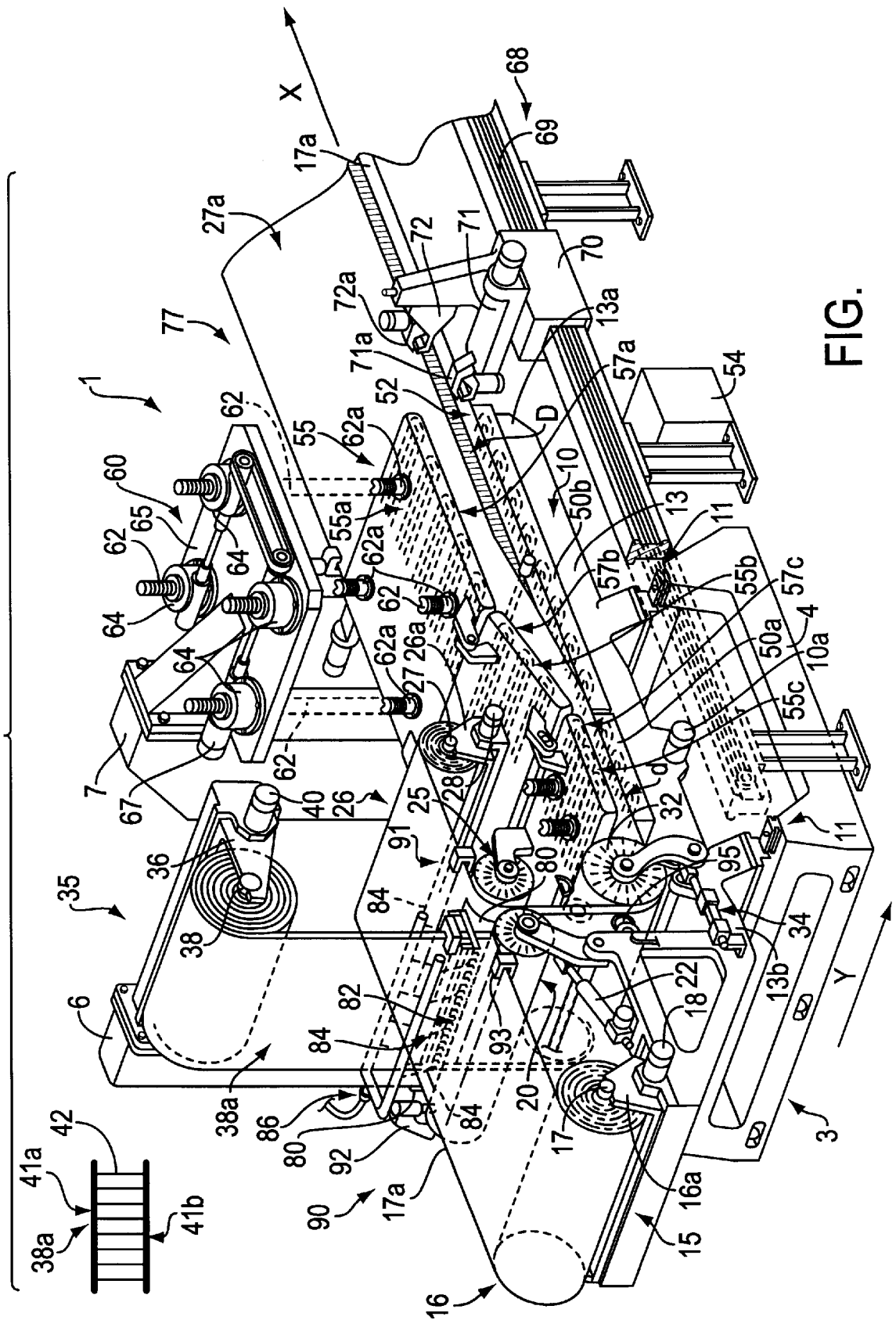

CONTINUOUS FORMING METHOD AND DEVICE FOR A COMPOSITE STRUCTURE, IN PARTICULAR A COMPOSITE STRUCTURE FEATURING THREE-DIMENSIONAL FABRIC

BACKGROUND OF THE INVENTION

1. Field of the Invention

The present invention relates to a continuous forming method and device for a composite structure, in particular a composite structure featuring a three-dimensional intermediate fabric composed of two sheets of fabric facing each other and connected by a number of yarns extending from the adjacent walls of the two sheets.

2. Description of the Related Art

Composite structures, e.g. of the type described in Italian Patent Application n. TO91A000397 filed on May 29, 1991 by the present Applicant and entitled "Process for producing a composite structure with three-dimensional intermediate fabric, and structure produced thereby", are known to be produced using a forming device (e.g. a press) onto which the three-dimensional fabric impregnated with thermosetting or thermoplastic resin is fed.

The device provides for setting the resin and forming the three-dimensional fabric into a rigid panel in which the yarns are completely hardened and extend perpendicularly between the sheets for rigidly connecting them.

Known devices provide for forming panels of substantially the same size (width and length) as the three-dimensional fabric fed onto the press.

SUMMARY OF THE INVENTION

It is an object of the present invention to provide a method and device for continuously forming a composite structure, of the type described above, of substantially unlimited length.

According to the present invention, there is provided a method of continuously forming a composite structure comprising at least a three-dimensional fabric composed of a first and second sheet of fabric facing each other and connected by intermediate yarns, characterized in that it comprises stages consisting in:

providing a continuous supply of three-dimensional fabric;

impregnating said three-dimensional fabric with thermoreactive resin;

mating said three-dimensional fabric with a first outer strip contacting said first sheet of fabric, and a second outer strip contacting said second sheet of fabric, to form a stratified structure containing the impregnated three-dimensional fabric;

feeding said stratified structure in a straight direction;

heating said stratified structure to at least partially polymerize the resin between said outer strips and said first and second sheets of fabric, while the resin impregnating the yarns remains substantially in the plastic state; said first and second sheets of fabric adhering to said outer strips;

parting said outer strips as said stratified structure is fed in said direction, to at least partially distend said yarns; and fully solidifying the resin impregnating said three-dimensional fabric.

The present invention also relates to a device for continuously forming a composite structure comprising at least a three-dimensional fabric composed of a first and second sheet of fabric facing each other and connected by intermediate yarns, characterized in that it comprises:

first and second container means for providing a continuous supply of a first and second strip;

dispensing means for providing a continuous supply of three-dimensional fabric;

impregnating means for applying thermoreactive resin to at least said three-dimensional fabric;

combining means for mating said three-dimensional fabric with said first and second strips, so that said first and second strips contact said first and second sheets of fabric to form a continuous stratified structure containing said impregnated three-dimensional fabric;

feed means for feeding said three-dimensional fabric in a straight direction;

forming means for heating said stratified structure as it is fed along, to at least partially polymerize the resin between said outer strips and said first and second sheets of fabric, while the resin impregnating said yarns remains substantially in the plastic state;

said forming means also parting said outer strips as said stratified structure is fed in said direction, to at least partially distend said yarns; and final polymerizing means for fully solidifying the resin impregnating said three-dimensional fabric.

BRIEF DESCRIPTION OF THE DRAWING

The invention will now be described with reference to the accompanying drawing which shows a view in perspective of a non-limiting embodiment of a device for continuously forming a composite structure and implementing the method according to the teachings of the present invention.

DESCRIPTION OF THE PREFERRED EMBODIMENTS

Number 1 in the accompanying drawing indicates a device for continuously forming a composite structure and wherein a supporting structure 3 comprises a substantially rectangular base structure 4, and two vertical column structures 6, 7 integral with and extending along one side of base structure 4.

Device 1 also comprises a slide 10 moved back and forth, by an electric motor 10a, along a horizontal guide 11 fitted to base structure 4 and defining a traveling direction Y.

Slide 10 comprises a flat rectangular structure 13 extending transversely in relation to guide 11 and presenting a first free end portion 13a adjacent to column structure 7, and a second end portion 13b integral with a metal frame 15 extending upwards and presenting a triangular lateral profile.

Metal frame 15 supports a first dispenser 16 comprising a U-shaped structure 16a supporting an idle shaft 17 parallel to axis Y and movable axially in relation to frame 15 by an electric motor 18 fitted to and projecting from frame 15.

Shaft 17 supports a roll of impermeable strip material 17a, e.g. Mylar, the function of which will be explained later on.

Frame 15 also supports a first roller 20 parallel to axis Y and pushed by an elastic system 22 against a second roller 25 parallel to axis Y and supported on slide 11. Slide 11 also supports a second dispenser 26 located on the opposite side of rollers 20, 25 to first dispenser 16, and comprising a U-shaped structure 26a supporting a horizontal idle shaft 27 parallel to axis Y and movable axially in relation to slide 11 by an electric motor 28.

Shaft 27 supports a roll of impermeable strip material 27a, the function of which will be explained later on.

Slide 11 also supports a third roller 32 parallel to axis Y and supported on an elastic system 34 beneath rollers 20, 25.

Roller 32 is larger in diameter than rollers 20, 25, and is defined by an outer cylindrical surface tangent to a vertical plane (not shown) substantially tangent to the cylindrical surface of roller 25.

Device 1 also comprises a third dispenser 35 composed of a U-shaped structure 36 projecting from the top end of column structure 6, and an idle shaft 38 parallel to axis Y and supported on structure 36. Shaft 38 is located on the opposite side of rollers 20, 25 to roller 32, and is movable axially by an electric motor 40 fitted to and projecting from structure 36.

Shaft 38 supports a roll of fabric 38a, e.g. three-dimensional fabric, the function of which will be described later on. More specifically, three-dimensional fabric 38a is composed of two sheets 41a, 41b of fabric facing each other and connected by a number of flexible intermediate yarns 42 extending from the facing surfaces of sheets 41a, 41b.

Device 1 also comprises a rectangular bottom half mold 50 supported on structure 13 and extending from roller 32 to end 13a of structure 13. Half mold 50 is composed of a first rectangular portion 50a adjacent to roller 32, and a second rectangular portion 50b hinged to portion 50a, and defines, as a whole, a flat horizontal supporting surface 52 presenting a number of holes (not shown) connected to a pump 54 (shown schematically) for producing a vacuum by suction. Half mold 50 cooperates with a top half mold 55 facing bottom half mold 50 and composed of three hinged, rectangular-plate-shaped portions 55a, 55b, 55c. Portions 55a and 55c are supported on column structure 7 and a column structure parallel to structure 7 (and not shown for the sake of simplicity).

Portion 55c is located adjacent to roller 32, and is defined at the bottom by a flat surface 57c facing and parallel to surface 52; intermediate portion 55b is defined at the bottom by a flat surface 57b facing surface 52 and separated from it by a distance increasing towards portion 55a; while portion 55a is located adjacent to column structure 7, and is defined at the bottom by a surface 57a facing and parallel to surface 52 and separated from it by a distance D greater than the distance d between surface 52 and surface 57c. The distance between half molds 50 and 55 is adjustable by means of a vertical adjusting device 60 (fitted to column structure 7 and to the column structure supporting portion 55c) composed of four screws 62, the bottom ends 62a of which are connected to portion 55a, and the top ends of which mate with nut screws (not shown) housed inside respective housings 64 supported on a rectangular plate 65 fitted to and projecting from the end of column structure 7. The nut screws (not shown) are defined by helical gears (not shown) driven by an electric motor 67 fitted to and projecting from plate 65.

Forming device 1 also comprises a linear feed device 68 composed of two horizontal guides 69 (only one shown) extending on either side of slide 11 and parallel to the longer sides of structure 13. Guides 69 support slides 70, each of which presents two grippers 71, 72 facing slide 11 and presenting gripping fingers 71a, 72a at different heights.

By means of respective actuating means (not shown), each gripper 71, 72 is movable back and forth along a respective straight guide (not shown) supported on slide 70 and parallel to axis X.

Slides 70 are movable between a first position (not shown) wherein grippers 71, 72 face portion 55c of the top half mold, and a second position (shown in the drawing) wherein grippers 71, 72 are located close to an end portion of portion 55a.

In actual use, to set up device 1, rolls of strips 17a, 27a are fitted respectively to shafts 17, 27 of dispensers 16, 26, and a roll of three-dimensional fabric 38a is fitted to shaft 38 of dispenser 35.

Roller 20 is moved from the position shown in the drawing into an idle position (not shown) wherein it is detached from roller 25; and strips 17a, 27a and three-dimensional fabric 38a are inserted manually into device 1.

More specifically, strip 17a is so arranged as to extend along a first horizontal portion between dispenser 16 and roller 20, along a second vertical portion between roller 20 and roller 32, and about roller 32 so as to extend along a third horizontal portion on surface 52 of half mold 50 and between roller 32 and grippers 71 by which a peripheral portion of strip 17a is gripped by means of fingers 71a.

Strip 27a is so arranged as to extend along a first horizontal portion between dispenser 26 and roller 25, along a second vertical portion between roller 25 and roller 32, and about roller 32 so as to extend along a third horizontal portion beneath surfaces 57a, 57b, 57c and between roller 32 and grippers 72 by which a peripheral portion of strip 27a is gripped by means of fingers 72a.

Three-dimensional fabric 38a extends vertically from dispenser 35 to roller 32 and between strips 17a, 27a as these are guided downwards by rollers 20, 25; and, inserted between strips 17a, 27a, then extends between half molds 50, 55 in direction X.

Three-dimensional fabric 38a and strips 17a, 27a thus combine to form a stratified structure 77 located between half molds 50, 55 and drawn by grippers 71, 72 in direction X.

Following setup of device 1, roller 20 is restored from the idle position to the position shown in the drawing.

Between rollers 20 and 25, two transverse side pieces 80 with curved bottom edges having the same curvature as rollers 20, 25 are then placed with the curved bottom edges contacting the portions of strips 17a, 27a carried on rollers 20, 25. Together with strips 17a and 27a, side pieces 80 thus define a trough 82 into which thermosetting resin 84 is fed by a spray device 86 with a number of in-line nozzles.

Resin 84 inside trough 82 impregnates three-dimensional fabric 38a while grippers 71, 72 are closed and slides 70 are moved from the first to the second position to feed an impregnated portion of stratified structure 77 between half molds 50 and 55.

Grippers 71, 72 are then opened; slides 70 are moved back to the first position; and top half mold 55 is brought towards bottom half mold 50 to press stratified structure 77 so that sheets 41a, 41b and yarns 42 of three-dimensional fabric 38a are permeated evenly by resin 84.

Strips 17a, 27a thus provide for containing and preventing resin 84 from seeping from stratified structure 77.

Half molds 50, 55 are then heated using known means (e.g. electric resistors) to achieve partial polymerization of resin 84 and adhesion of outer sheets 41a, 41b of three-dimensional fabric 38a to strips 17a, 27a; and the vacuum pump (not shown) is activated to retain strips 17a, 27a firmly to surface 52 of bottom half mold 50 and surfaces 57a, 57b, 57c of top half mold 55 respectively.

The nonimpregnated portion of stratified structure is then eliminated; and half molds 50, 55 are opened so that surfaces 57a, 57c of portions 55a, 55c are again parallel to surface 52, and surface 57b again slopes upwards in relation to surface 52 and in traveling direction X.

At this point, device 1 is ready to operate in steady-state manner, and grippers 71, 72 are moved cyclically between the first and second positions to draw stratified structure 77 between bottom half mold 50 and top half mold 55 in traveling direction X.

The above operation provides for forming stratified structure 77 in that, as structure 77 travels between bottom half mold 50 and portion 57b (which slopes in relation to surface 52), strips 17a, 27a and sheets 41a, 41b diverge from each other so as to straighten yarns 42 impregnated with resin in a substantially plastic state.

Stratified structure 77 thus increases in thickness as it travels between half mold 50 and portion 55b; and is subsequently fed between bottom half mold 50 and portion 57a of top half mold 55 where resin 84 is fully polymerized.

As such, the stratified structure emerging from half molds 50, 55 is composed of two sheets of fabric 41a, 41b stiffened by the solidified resin, adhering firmly to strips 17a, 27a, and connected to each other by yarns 42 stiffened by the solidified resin.

During setup of device 1, the mutual position of half molds 50, 55 may be adjusted to vary the inclination of yarns 42 along axis Y and in relation to surface 52, by moving slide 10, and hence bottom half mold 50, along guides 11 so as to shift stratified structure 77 along axis Y and hence transversely in relation to traveling direction X.

During setup of device 1, one of outer sheets 41a, 41b (and respective adjacent strip 17a, 27a) may be shifted along axis X to adjust its position in relation to stratified structure 77, by gripping sheet 41a or 41b (and respective strip 17a or 27a) with gripper 71 or 72, while the other gripper is left open, and by moving the active gripper in relation to slide 70 so as to shift one sheet of three-dimensional fabric 38a in relation to the other and so adjust the inclination of yarns 42 in direction X.

Device 1 also presents two devices 90, 91 for repositioning strips 17a, 27a in relation to stratified structure 77 during setup of device 1.

As devices 90, 91 are identical and mounted on slide 10 symmetrically in relation to rollers 20, 25, only device 90 for repositioning strip 17a in relation to stratified structure 77 will be described. In particular, device 90 comprises a pair of grippers 92, 93 located close to roller 20 and facing opposite edges of strip 17a; and a pair of suction cups 95 facing strip 17a and supported on a horizontal bar (not shown) located beneath roller 20 and movable parallel to direction Y by an actuator (not shown), e.g. a pneumatic actuator.

In actual use, to reposition strip 17a in relation to stratified structure 77, grippers 92, 93 are closed; and suction cups 95 are activated to grip the surface of strip 17a, and are then moved laterally to shift strip 17a in relation to three-dimensional fabric 38a and in relation to strip 27a.

Once strip 17a is repositioned, suction cups 95 are deactivated, and grippers 92, 93 released.

Device 1 according to the present invention thus provides for continuously forming a composite structure featuring a three-dimensional intermediate fabric and of theoretically unlimited length, which length is practically only limited by the length of strips 17a, 27a and fabric 38a storable in the respective dispensers.

For this reason, strips 17a, 27a may be replaced by powered endless belts extending between end pulleys (not shown) and presenting facing portions enclosing opposite sides of stratified structure 77.

More specifically, the facing portions of the belts may diverge in direction X to distend yarns 42 as the three-dimensional fabric travels in direction X; and the belts may conveniently be made of metal (e.g. steel) and present heating devices for partially setting the resin impregnating three-dimensional fabric 38a. In such an embodiment, belts 17a, 27a mainly provide for containing the resin and forming the opposite faces of the stratified structure.

In this case, the resulting stratified structure obviously presents no outer strips 17a, 27a.

Clearly, changes may be made to the forming device and method as described and illustrated herein without, however, departing from the scope of the present invention.

On each side of device 1, for example, linear feed device 68 may present two slides traveling in opposite directions along guides parallel to direction X, and each presenting a pair of grippers.

Composite structure 77 may comprise a pair of outer sheets of fabric (not shown) interposed between sheets 41a, 41b of three-dimensional fabric 38a and strips 17a, 27a; and strips 17a, 27a may be detached from composite structure 77 after polymerizing resin 84.

What is claimed is:

1. A method for continuously forming a composite structure comprised of a three-dimensional fabric including first and second sheets of fabric which face each other and which are connected by intermediate yarn, the method comprising:

providing a continuous supply of three-dimensional fabric;

impregnating the three-dimensional fabric with resin which is thermoreactive to provide an impregnated three-dimensional fabric;

mating the impregnated three-dimensional fabric with a first outer strip which contacts the first sheet of fabric, and a second outer strip which contacts the second sheet of fabric to form a stratified structure containing the impregnated three-dimensional fabric;

feeding the stratified structure along a path in a feed direction X which is straight;

heating the stratified structure to at least partially polymerize the resin between the first outer strip and the first sheet of fabric and between the second outer strip and the second sheet of fabric, while the resin impregnating the intermediate yarn of the three-dimensional fabric remains substantially in the plastic state, so that the first and second outer strips adhere respectively to the first and second sheets of fabric;

parting the first and second outer strips as the stratified structure is fed in the feed direction X to at least partially distend the intermediate yarn of the three-dimensional fabric by inserting the stratified structure between at least a bottom half mold and a top half mold, which bottom half and top half molds have respective facing surfaces which are separated by a distance which increases in the feed direction X and to which the first and second outer strips adhere respectively; and fully solidifying the resin impregnating the three-dimensional fabric, wherein at least one of the bottom half mold and top half mold is shifted in relation to the other half mold in at least one transverse direction Y which is transverse to the feed direction X for adjusting the inclination of the intermediate yarn of the three-dimensional fabric at least in the transverse direction Y.

2. The method as claimed in claim 1, further comprising adjusting the distance between the facing surfaces of the bottom half and the top half molds.

3. The method as claimed in claim 1, wherein the first outer strip and the second outer strip each have a pair of straight edges, one of the pair of straight edges of the first outer strip opposing one of the pair of straight edges of the second outer strip, and wherein feeding the stratified structure in a feed direction X includes applying at least one gripping member to the straight edges which oppose one another and moving the gripping member along a guide parallel to the feed direction X.

4. The method as claimed in claim 3, wherein one of the first sheet of fabric or the second sheet of fabric is gripped by a gripping member, and wherein the gripping member is moved in the feed direction X for adjusting the inclination of the yarn of the three-dimensional fabric in the feed direction X.

5. The method as claimed in claim 1, further comprising detaching the first and second outer strips from the three-dimensional fabric.

6. A device for continuously forming a composite structure comprised of a three-dimensional fabric including first and second sheets of fabric which face each other and which are connected by intermediate yarns, the device comprising:

first and second container means for providing a continuous supply of a first outer strip and a second outer strip;

dispensing means for providing a continuous supply of three-dimensional fabric;

impregnating means for applying resin which is thermoreactive to at least the three-dimensional fabric to provide an impregnated three-dimensional fabric;

combining means for mating the three-dimensional fabric with the first outer strip and the second outer strip so that the first outer strip contacts the first sheet of fabric and the second outer strip contacts the second sheet of fabric to form a continuous stratified structure containing the impregnated three-dimensional fabric;

feed means for feeding the three-dimensional fabric in a feed direction X which is straight;

forming means for (a) heating the stratified structure as it is fed along to at least partially polymerize the resin between the first outer strip and the first sheet of fabric and between the second outer strip and the second sheet of fabric, while the resin impregnating the intermediate yarn of the three-dimensional fabric remains substantially in the plastic state, and for (b) parting the outer strips as the stratified structure is fed in the feed direction X to at least partially distend the intermediate yarn, the forming means comprising at least a bottom half mold and a top half mold having respective facing surfaces which are separated by a distance which increases in the feed direction X, the half molds providing means for forming a vacuum by suction and achieving adhesion of the first and second outer strips to respective facing surfaces;

means for shifting at least one of the bottom half mold and the top half mold in relation to the other half mold in a transverse direction Y which is transverse to the feed direction X; and final polymerizing means for fully solidifying the resin impregnating the three-dimensional fabric.

7. The device as claimed in claim 6, further comprising means for adjusting the distance between the facing surfaces of the bottom half mold and the top half mold.

8. The device as claimed in claim 6, wherein the feed means comprises at least one pair of grippers which are supported on slides and which travel back and forth along straight guides parallel to the feed direction X, each pair of grippers engaging opposite straight edges of at least one of the first outer strip and the second outer strip.

9. The device as claimed in claim 8, wherein the grippers of the at least one pair of grippers are movable in relation to the slide along respective straight guides parallel to the feed direction X, and wherein, during setup of the device, one of the grippers grips one of the first sheet or the second sheet of fabric for moving it in relation to the stratified structure so that inclination of the intermediate yarn is adjusted.

10. The device as claimed in claim 6, wherein the dispensing means comprises an idle shaft which is movable axially by drive means and which supports a roll of the three-dimensional fabric.

11. The device as claimed in claim 10, wherein the first and second container means are located on opposite sides of and beneath the dispensing means.

12. The device as claimed in claim 6, wherein the first and second container means comprise respective supply means having respective idle shafts movable axially by respective drive means and supporting rolls of the first and second outer strips.

13. The device as claimed in claim 6, further comprising elastic means, and wherein the combining means comprise a first roller and a second roller which are parallel to each other and which are connected to the elastic means for pushing the first and second rollers towards each other; the first and second rollers presenting cylindrical surfaces cooperating respectively with the first and second outer strips from respective first and second container means for curving the first and second outer strips and inserting the three-dimensional fabric between the first and second outer strips.

14. The device as claimed in claim 13, wherein the impregnating means comprise a plurality of nozzles for spraying the resin onto the three-dimensional fabric.

15. The device as claimed in claim 14, wherein the impregnating means comprise a pair of side pieces placed transversely between the first and second rollers and having curved bottom edges which adhere in a fluidtight manner to the first and second outer strips and which curve about the first and second rollers to form a trough for the resin.

16. The device as claimed in claim 6, wherein the bottom half mold defines a supporting surface which is substantially flat, and wherein the top half mold comprises at least three portions hinged to one another including a first portion presenting a flat surface which is parallel to and faces the supporting surface of the bottom half mold, a second portion having a flat surface which slopes in relation to the supporting surface and upwards in the feed direction X, and a third portion defining a flat surface which is parallel to and faces the said supporting surface of the bottom half mold.

17. The device as claimed in claim 6, further comprising means for repositioning the first and second outer strips in relation to the stratified structure.

18. The device as claimed in claim 17, wherein the repositioning means comprise at least a pair of grippers which face opposite edges of the first outer strip, and a plurality of suction cups which face the first outer strip and which are supported on a member movable by actuating means in a direction perpendicular to the feed direction X.

19. A method of continuously forming a composite structure comprised of a three-dimensional fabric including first and second sheets of fabric which face each other and which are connected by intermediate yarn, the method comprising:

providing a continuous supply of three-dimensional fabric;

impregnating the three-dimensional fabric with resin which is thermoreactive;

mating the three-dimensional fabric with a first outer strip which contacts the first sheet of fabric, and a second outer strip which contacts the second sheet of fabric to form a stratified structure containing the impregnated three-dimensional fabric;

feeding the stratified structure along a path in a feed direction X which is straight;

heating the stratified structure to at least partially polymerize the resin between the first outer strip and the first sheet of fabric and between the second outer strip and the second sheet of fabric, while the resin impregnating the intermediate yarn of the three-dimensional fabric remains substantially in the plastic state, so that the first and second outer strips adhere respectively to the first and second sheets of fabric;

parting the first and second outer strips as the stratified structure is fed in feed direction X to at least partially distend the intermediate yarn of the three-dimensional fabric; and fully solidifying the resin impregnating the three-dimensional fabric.

20. The method as claimed in claim 19, wherein parting the first and second outer strips is accomplished by inserting the stratified structure between at least a bottom half mold and a top half mold, which bottom half and top half molds have respective facing surfaces which are separated by a distance which increases in the feed direction X and to which the first and second outer strips adhere respectively.

21. The method as claimed in claim 20, further comprising adjusting the distance between the facing surfaces of the bottom half and the top half molds.

22. The method as claimed in claim 20, wherein at least one of the bottom half and top half molds is shifted in relation to the other half mold in at least one transverse direction Y which is transverse to the feed direction X for adjusting the inclination of the intermediate yarn of the three-dimensional fabric at least in the transverse direction Y.

23. The method as claimed in claim 19, wherein the first outer strip and the second outer strip each have a pair of straight edges, one of the pair of straight edges of the first outer strip opposing one of the pair of straight edges of the second outer strip, and wherein feeding the stratified structure in a feed direction X includes applying at least one gripping member to the straight edges which oppose one another and moving the gripping member along a guide parallel to the feed direction X.

24. The method as claimed in claim 19, wherein one of the first sheet of fabric or the second sheet of fabric is gripped by a gripping member, and wherein the gripping member is moved in the feed direction X for adjusting the inclination of the yarn of the three-dimensional fabric in the feed direction X.

25. The method as claimed in claim 19, further comprising detaching the first and second outer strips from the three-dimensional fabric.

26. A device for continuously forming a composite structure comprised of a three-dimensional fabric including first and second sheets of fabric which face each other and which are connected by intermediate yarns, the device comprising:

first and second container means for providing a continuous supply of a first outer strip and a second outer strip;

dispensing means for providing a continuous supply of three-dimensional fabric;

impregnating means for applying resin which is thermoreactive to at least the three-dimensional fabric to provide an impregnated three-dimensional fabric;

combining means for mating the three-dimensional fabric with the first outer strip and the second outer strip so that the first outer strip contacts the first sheet of fabric and the second outer strip contacts the second sheet of fabric to form a continuous stratified structure containing the impregnated three-dimensional fabric;

feed means for feeding the three-dimensional fabric in a feed direction X which is straight;

forming means for (a) heating the stratified structure as it is fed along to at least partially polymerize the resin between the first outer strip and the first sheet of fabric and between the second outer strip and the second sheet of fabric, while the resin impregnating the intermediate yarn of the three-dimensional fabric remains substantially in the plastic state, and for (b) parting the outer strips as the stratified structure is fed in the feed direction X to at least partially distend the intermediate yarn; and final polymerizing means for fully solidifying the resin impregnating the three-dimensional fabric.

27. The device as claimed in claim 26, wherein the forming means comprises at least a bottom half mold and a top half mold having respective facing surfaces which are separated by a distance which increases in the feed direction X, the bottom half and top half molds providing means for forming a vacuum by suction and achieving adhesion of the first and second outer strips to respective facing surfaces.

28. The device as claimed in claim 27, further comprising means for adjusting the distance between the facing surfaces of the bottom half and top half molds.

29. The device as claimed in claim 27, further comprising means for shifting at least one of the bottom half mold and the top half mold in relation to the other half mold in a transverse direction Y which is transverse to the feed direction X.

30. The device as claimed in claim 27, wherein the bottom half mold defines a supporting surface which is substantially flat, and wherein the top half mold comprises at least three portions hinged to one another including a first portion presenting a flat surface which is parallel to and faces the supporting surface of the bottom half mold, a second portion having a flat surface which slopes in relation to the supporting surface and upwards in the feed direction X, and a third portion defining a flat surface which is parallel to and faces the said supporting surface of the bottom half mold.

31. The device as claimed in claim 26, wherein the feed means comprises at least one pair of grippers which are supported on slides and which travel back and forth along straight guides parallel to the feed direction X, each pair of grippers engaging opposite straight edges of at least one of the first outer strip and the second outer strip.

32. The device as claimed in claim 31, wherein the grippers of the at least one pair of grippers are movable in relation to the slide along respective straight guides parallel to the feed direction X, and wherein, during setup of the device, one of the grippers grips one of the first sheet or the second sheet of fabric for moving it in relation to the stratified structure so that inclination of the intermediate yarn is adjusted.

33. The device as claimed in claim 26, wherein the dispensing means comprises an idle shaft which is movable axially by drive means and which supports a roll of the three-dimensional fabric.

34. The device as claimed in claim 33, wherein the first and second container means are located on opposite sides of and beneath the dispensing means.

35. The device as claimed in claim 26, wherein the first and second container means comprise respective supply means having respective idle shafts movable axially by respective drive means and supporting rolls of the first and second outer strips.

36. The device as claimed in claim 26, further comprising elastic means, and wherein the combining means comprise a first roller and a second roller which are parallel to each other and which are connected to the elastic means for pushing the first and second rollers towards each other; the first and second rollers presenting cylindrical surfaces cooperating respectively with the first and second outer strips from respective first and second container means for curving the first and second outer strips and inserting the three-dimensional fabric between the first and second outer strips.

37. The device as claimed in claim 36, wherein the impregnating means comprise a plurality of nozzles for spraying the resin onto the three-dimensional fabric.

38. The device as claimed in claim 37, wherein the impregnating means comprise a pair of side pieces placed transversely between the first and second rollers and having curved bottom edges which adhere in a fluidtight manner to the first and second outer strips and which curve about the first and second rollers to form a trough for the resin.

39. The device as claimed in claim 26, further comprising means for repositioning the first and second outer strips in relation to the stratified structure.

40. The device as claimed in claim 39, wherein the repositioning means comprise at least a pair of grippers which face opposite edges of the first outer strip, and a plurality of suction cups which face the first outer strip and which are supported on a member movable by actuating means in a direction perpendicular to the feed direction X.

* * * * *